United States Patent
Thompson et al.

(10) Patent No.: US 6,372,299 B1
(45) Date of Patent: Apr. 16, 2002

(54) METHOD FOR IMPROVING THE OXIDATION-RESISTANCE OF METAL SUBSTRATES COATED WITH THERMAL BARRIER COATINGS

(75) Inventors: Anthony Mark Thompson, Niskayuna; Dennis Michael Gray, Delanson; Melvin Robert Jackson, Niskayuna, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/407,496

(22) Filed: Sep. 28, 1999

(51) Int. Cl.$^7$ .................................................. C23C 4/04
(52) U.S. Cl. ...................... 427/456; 427/454; 427/250; 427/376.8; 427/383.7; 427/405; 427/419.2
(58) Field of Search .................... 427/454, 456, 427/250, 376.8, 383.7, 405, 419.2; 428/546

(56) References Cited

U.S. PATENT DOCUMENTS

| 4,461,799 A | 7/1984 | Gavrilov et al. |
| 4,546,051 A | 10/1985 | Uchida et al. |
| 5,384,200 A | 1/1995 | Giles et al. |
| 5,863,668 A | * 1/1999 | Brindley et al. ............ 428/612 |
| 5,939,204 A | 8/1999 | Czech |
| 6,136,453 A | * 10/2000 | Ritter et al. ................ 428/612 |

FOREIGN PATENT DOCUMENTS

| DE | 19615012 | 2/1997 |
| FR | 2029320 | 10/1970 |
| WO | WO 99/06609 | 2/1999 |

OTHER PUBLICATIONS

Patent Abstractsof Japan, vol. 011, No. 141 (C–421), May 8 1987 & JP 61281863 A (Toyota otor Corp), Dec. 12 1986.
Japanese Abstracts (61281863) (no date).

* cited by examiner

Primary Examiner—Katherine A. Bareford
(74) Attorney, Agent, or Firm—Paul J. DiConza; Donald S. Ingraham

(57) ABSTRACT

A method for providing a protective coating on a metal-based substrate is disclosed. The method involves the application of an aluminum-rich mixture to the substrate to form a discontinuous layer of aluminum-rich particles, followed by the application of a second coating over the discontinuous layer of aluminum-rich particles. Aluminum diffuses from the aluminum-rich layer into the substrate, and into any bond coat layer which is subsequently applied. Related articles are also described.

37 Claims, No Drawings

METHOD FOR IMPROVING THE OXIDATION-RESISTANCE OF METAL SUBSTRATES COATED WITH THERMAL BARRIER COATINGS

This invention was made with government support under Contract No. DEFC2195MC31176 awarded by the Department of Energy (DoE). The government may have certain rights to the invention.

BACKGROUND OF THE INVENTION

This invention relates generally to protective coatings for metal substrates. More particularly, it is directed to improved thermal barrier coatings applied to metals designed for high temperature applications.

Superalloys are often the materials of choice for components intended for high-temperature environments. As an example, turbine blades and other parts of turbine engines are often formed of nickel-based superalloys because they need to maintain their integrity at temperatures of at least about 1000° C.–1150° C. Protective coatings, often referred to as thermal barrier coatings or "TBC"s, effectively increase the operating temperature of turbine components by maintaining or reducing the surface temperature of the alloys used to form the various engine components.

Most TBC's are ceramic-based, such as a material like yttria-stabilized zirconia. For a jet engine, the coatings are applied to various surfaces, such as turbine blades and vanes, combustor liners, and combustor nozzles. Usually, the TBC ceramics are applied to an intervening bond layer which has been applied directly to the surface of the metal part. The bond layer is often critical for improving the adhesion between the metal substrate and the TBC. Bond layers are usually formed from a material like "MCrAlY", where "M" represents a metal like iron, nickel, or cobalt.

The term "superalloy" is usually intended to embrace complex cobalt- or nickel-based alloys which include one or more other elements such as aluminum, chromium, tungsten, molybdenum, titanium, and iron. The quantity of each element in the alloy is carefully controlled to impart specific characteristics, e.g., mechanical properties such as high-temperature strength. Aluminum is a particularly important component for many superalloys, because of its function in the precipitation-strengthening of the alloy.

If the superalloy is exposed to an oxidizing atmosphere for an extended period of time, it can become depleted in aluminum. This is especially true when the particular superalloy component is used at the elevated temperatures described above. The aluminum loss can occur by way of various mechanisms. For example, aluminum can diffuse into the bond coat, be consumed during oxidation of the bond coat, or be consumed during oxidation at the bond coat/substrate interface. The last-mentioned mechanism is particularly severe in porous bond coats, such as air plasma-sprayed (APS) bond coats. Aluminum-loss from the substrate is accelerated if the TBC or bond coat is removed during the service life of the component.

Since loss of aluminum can be detrimental to the integrity of the superalloy, techniques for countering such a loss have been investigated. At elevated temperatures, the substrate can be partially "replenished" with aluminum which diffuses from an adjacent MCrAlY-type bond coat. However, the amount of aluminum diffusion into the substrate from the bond coat is usually insufficient.

One method for increasing the aluminum content of the superalloy in its surface region is sometimes referred to in the art as "aluminiding". In such a process, aluminum is introduced into the substrate by a variety of techniques. In the "pack aluminiding" process, the substrate is immersed within a mixture or pack containing the coating element source, filler material, and halide energizer. At temperatures about 850–1100° C., chemical reactions within the mixture yield an aluminum-rich vapor which condenses onto the substrate surface, and subsequently diffuses into the substrate.

While aluminiding successfully provides aluminum to the substrate and substrate-bond coat interface, there are some disadvantages associated with such a technique. For example, the resulting high-aluminum surface layer can be brittle. Deposition of an overlay bond coat on a brittle surface can sometimes be difficult.

It should thus be apparent that new methods for increasing the aluminum content of the superalloy surface and thereby increasing its oxidation life would be welcome in the art. These methods should prevent the formation of a brittle layer between the substrate and any subsequently-applied layer. Moreover, the new methods should result in a surface which is very amenable to deposition of subsequently-applied layers. It would also be very advantageous for the new methods to be capable of providing aluminum to a bond coat layer, to compensate for aluminum consumed in the bond coat by way of oxidation.

SUMMARY OF THE INVENTION

In one embodiment, the invention is directed to a method for providing a protective coating on a metal-based substrate, comprising the following step:

(a) applying an aluminum-rich mixture to the substrate to form a discontinuous layer of aluminum-rich particles in a matrix of metallic bond coat alloy, wherein the amount of aluminum in the particles exceeds the amount of aluminum in the metallic bond coat alloy by about 0.1 atomic % to about 40 atomic %, and wherein the total amount of aluminum in the mixture is in the range of about 10 atomic % to about 50 atomic per cent.

In a second embodiment, the invention is directed to a method for providing a protective coating on a metal-based substrate, comprising the following steps:

(a) applying an aluminum-rich mixture to the substrate to form a discontinuous layer of aluminum-rich particles in a matrix of metallic bond coat alloy, wherein the amount of aluminum in the particles exceeds the amount of aluminum in the metallic bond coat alloy by about 0.1 atomic % to about 40 atomic %, and wherein the total amount of aluminum in the mixture is in the range of about 10 atomic % to about 50 atomic %; and then (b) applying at least one coating layer over the discontinuous layer of aluminum-rich particles.

Aluminum diffuses from the aluminum-rich layer into the superalloy substrate, as discussed below. The discontinuous nature of the aluminum-rich layer prevents embrittlement.

In preferred embodiments, substantially all of the aluminum-rich material comprises non-oxide particles. Moreover, in many preferred embodiments, the aluminum rich layer is formed of two components. Component (I) usually comprises particles of aluminum and a second metal, such as nickel, while component (II) usually comprises particles of an alloy of the formula MCrAlY, where M is a metal like Fe, Ni, Co, or mixtures which comprise any of the foregoing. The aluminum-rich layer can be applied by plasma spray techniques, such as air plasma spray or vacuum plasma spray, or by high velocity oxygen fuel (HVOF).

In some embodiments, the layer formed with the aluminum-rich mixture is heat-treated after being applied, to allow diffusion of aluminum into the superalloy. Moreover, in certain embodiments, a conventional metallic bond layer is applied over the aluminum-rich layer, prior to deposition of a thermal barrier coating. The heat treatment mentioned above can alternatively be carried out after deposition of the thermal barrier coating.

Another aspect of this invention is directed to an article, comprising:

(i) a metal-based substrate; and (ii) an aluminum-containing layer over the substrate, comprising a discontinuous layer of aluminum-rich particles. In many preferred embodiments, the article may also include a thermal barrier coating disposed over the aluminum-containing layer.

As mentioned previously, the aluminum-containing layer can be formed from a mixture of a component based on particles of aluminum and nickel, along with a component based on a conventional MCrAlY alloy. Moreover, a metallic bond layer can be disposed between the aluminum-containing layer and the thermal barrier coating.

Further details regarding the various aspects of this invention are provided in the remainder of the disclosure.

DETAILED DESCRIPTION OF THE INVENTION

A variety of metals or metal alloys can be used as the substrate for the present invention. The term "metal-based" in reference to substrates disclosed herein refers to those which are primarily formed of metal or metal alloys, but which may also include some non-metallic components, such as ceramics, intermetallic phases, or intermediate phases. Usually, the substrate is a heat-resistant alloy, including superalloys which typically have an operating temperature of up to about 1100–5000° C. They are described in various references, such as U.S. Pat. Nos. 5,399,313 and 4,116,723, both incorporated herein by reference. Illustrative nickel-base superalloys are designated by the trade names Inconel®, Nimonic®, Rene® and Udimet®. The type of substrate can vary widely, but it is often in the form of an engine part, such as a turbine blade (bucket), a turbine nozzle guide vane, or a combustor liner. As another example, the substrate may be the piston head of a diesel engine, or any other surface requiring a heat-resistant barrier coating. In some instances, the substrate thickness can be quite small, for example, less than about 0.25 cm. Thermal protection of thin-walled superalloy components is often a critical task.

As mentioned above, an aluminum-rich mixture is applied to the substrate. Conventional pretreatment steps may be taken prior to deposition of the aluminum-rich mixture, e.g., cleaning of the substrate surface; grit blasting to remove debris and to roughen the surface; and the like. The amount of aluminum in the aluminum-rich mixture will depend in part on the amount of aluminum intended for diffusion from the layer into the superalloy substrate and into any subsequently-applied bond coat layer. Those amounts will in turn depend on the projected loss of aluminum from the substrate and bond coat layers during exposure to oxidizing atmospheres and high temperature. The approximate, projected loss of aluminum can be determined by, first, exposing the substrate and bond coat materials in the absence of the aluminum-rich layer of this invention to an oxidizing environment under selected time and temperature schedules. The microstructures of the materials can then be examined, using various devices, such as a scanning electron microscope (SEM), equipped with an energy-dispersive X-ray detector. Such devices are capable of quantifying the aluminum loss from the bond coat and from the surface region of the substrate. The "surface region" is defined herein as the region extending from the bond coat-substrate interface to about 600 microns into the substrate.

In general, the amount of aluminum in the aluminum-rich layer will be large enough to compensate for any projected loss of aluminum from the substrate or an adjacent bond coat layer, but small enough to prevent the formation of a continuous, brittle, aluminum-containing layer, as described previously. Parameters for aluminum content, based on atomic percentages, were provided above. In terms of weight percentages, the amount of aluminum in the mixture is often in the range of about 4% by weight to about 32% by weight. In preferred embodiments, the amount of aluminum is in the range of about 10% by weight to about 20% by weight. In some especially preferred embodiments, the amount of aluminum is in the range of about 12.5% by weight to about 19% by weight.

The aluminum-rich mixture can be obtained from a variety of sources. In general, any aluminum-containing material which can release aluminum into adjacent surfaces or layers at elevated temperatures, such as above about 600° C., would be suitable, as long as the material does not react adversely with the substrate material or the material which forms any subsequently-applied bond coat. Non-limiting examples of aluminum-releasing compounds which are suitable for most embodiments include those based on aluminum and nickel, such as NiAl and $Ni_3Al$; those based on aluminum and titanium, such as TiAl and $Ti_3Al$; those based on aluminum and iron, such as FeAl and $Fe_3Al$; those based on aluminum and cobalt, such as CoAl; and those based on aluminum and zirconium, such as $Zr_3Al$. Such materials are usually commercially available, or can be prepared without undue difficulty.

In some preferred embodiments, the aluminum-rich mixture is based on at least two components. Component (I) can be a compound based on aluminum and a second metal, as mentioned above. In general, the level of aluminum for this component is in the range of about 20 atomic % to about 55 atomic %, based on the total atoms of aluminum and the second metal. In regard to the exemplary aluminum-releasing compounds listed above, this range generally corresponds to a weight-based range of about 8% by weight to about 37% by weight aluminum.

Moreover, in preferred embodiments, the second metal is nickel to constitute the compounds NiAl or $Ni_3Al$. In the case of NiAl or $Ni_3Al$, conversion of a preferred atomic percentage-based range to a weight percentage-based range results in a range of about 13% by weight aluminum to about 31.5% by weight aluminum. Those skilled in the art understand that the proportion of atoms in such compounds may vary somewhat from the stoichiometric proportions, but are still within the scope of the formula-designation, NiAl or $Ni_3Al$.

In the embodiments based on at least two components, component (II) is usually a conventional material used for bond coats. Examples include alloys of the formula MCrAlY, where M is selected from the group consisting of Fe, Ni, Co, and mixtures thereof. Many of these types of alloys have a general composition, by weight, of about 17.0–23.0% chromium; about 4.5–12.5% aluminum; and about 0.1–1.2% yttrium; with M constituting the balance.

For the two-component embodiment, the relative proportions of components (I) and (II) will depend in part on some of the factors described above, regarding aluminum depletion and replenishment. In general, the level of component (I) is at least about 1% by volume, based on the total volume of components (I) and (II). In preferred embodiments, the level of component (I) is in the range of about 5% by volume to about 50% by volume, while in especially preferred embodiments, the level of component (I) is in the range of about 15% to about 50% by volume.

It should be understood that components (I) and (II) could alternatively be expressed in terms of weight percentages, as long as the densities of particles for each component are taken into account. As an example, if component (I) is NiAl, the particle density is approximately 5.8 g/cm$^3$. If component (II) is NiCrAlY (having a nominal composition as follows: 68 wt. % Ni, 22 wt. % Cr, 9 wt. % Al, and 1 wt. % Y), its particle density is approximately 8.0 g/cm$^3$. In such a case, 1% by volume converts to about 1% by weight, based on total weight; 5%–50% by volume converts to about 4%–42% by weight; and 15%–50% by volume converts to about 11%–42% by weight. In similar fashion, the weight levels of other materials for components (I) and (II) could be calculated, based on their volume levels and densities.

The thickness of the aluminum-rich layer will also depend on a variety of factors, such as the type of substrate being protected; the presence or absence of a subsequently-applied bond coat; and the desired amount of aluminum content. In those instances in which no bond coat is to be subsequently applied, the aluminum-rich layer will usually have a thickness in the range of about 25 microns to about 400 microns, and preferably, in the range of about 100 microns to about 300 microns. If a bond coat is to be subsequently applied, the aluminum-rich layer will often have a thickness in the range of about 25 microns to about 300 microns, and preferably, in the range of about 50 microns to about 200 microns.

The aluminum-rich mixture can be applied by a variety of techniques. Usually, a plasma spray technique or HVOF is preferred. For the plasma spray technique, an electric arc is typically used to ionize various gases, such as nitrogen, argon, helium, or hydrogen, to temperatures of about 8000° C. or greater. When the process is carried out in an air environment, it is often referred to as air plasma spray or "APS". The gases are expelled from an annulus at high velocity, creating a characteristic thermal plume. Powder material is fed into the plume, and the melted particles are accelerated toward the substrate being coated. Plasma-formed layers usually have a very rough surface, which enhances their adhesion to a subsequently-applied thermal barrier coating.

As mentioned earlier, the layer of aluminum-rich particles is discontinuous. In other words, the particles of the aluminum-rich material are not in continuous contact with each other. Instead, these discrete particles are usually separated from each other by particles of another metal-based material—usually the bond coat-type material MCrAlY. A minor portion of the aluminum-rich layer might be considered to be contiguous. "Contiguity" is a term which relates to the continuous nature of a layer of particles. Contiguity is defined herein as the fraction of total interfacial area of one phase that is shared by particles of the same phase.

In general, contiguity is a measure of the average degree of contact between aluminum-rich particles in the aluminum-rich mixture. The fraction of total interfacial area of one phase shared by particles of the same phase ranges from 0% to 100% as the distribution of aluminum-rich phase changes from a completely dispersed structure to a fully continuous structure. In some embodiments, the contiguity fraction for the aluminum-rich particles is less than about 65%. In other words, less than about 65% of the interfacial area of each aluminum-rich particle in the layer is in contact with an adjacent aluminum-rich particle. Such a layer is said to be "discontinuous" according to the present description of this invention. In preferred embodiments, the contiguity fraction for the aluminum-rich particles is less than about 40%. In especially preferred embodiments, the contiguity fraction for the aluminum-rich particles is less than about 25%.

The discontinuous nature of the aluminum-rich layer inhibits the embrittlement which characteristically occurs with continuous layers of aluminum-rich materials. In the case of the two-component aluminum-rich layer, the aluminum-rich particles of component (I) would be separated from each other by the particles of component (II), e.g., the MCrAlY matrix.

In some embodiments and especially in the case of a superalloy substrate, the aluminum-rich layer is heat-treated after being deposited. The heat treatment promotes the diffusion of aluminum into the substrate. It is usually carried out in an oxygen-free environment, to avoid oxidation of the layer. For example, the heat treatment could be carried out under vacuum, in a hydrogen atmosphere, or in an inert gas atmosphere.

The particular conditions for the heat treatment will depend on a variety of factors, such as the thickness and particular composition of the aluminum-rich layer; the type of substrate; the projected loss of aluminum from the substrate and/or from any subsequently-applied bond coat layer; the projected thermal exposure for the substrate in service; the required strength for the substrate alloy; and economic considerations. In general, the aluminum-rich layer is usually heat-treated at a temperature in the range of about 925° C. to about 1260° C., for a time period of about 15 minutes to about 16 hours. In some preferred embodiments, the heat treatment is carried out at a temperature in the range of about 980° C. to about 1150° C., for a time period of about 1 hour to about 8 hours. As described below, the heat treatment can alternatively be carried out at a later stage, such as after the deposition of additional layers of various materials.

As mentioned above, a metallic bond layer or "bond coat" may be applied over the aluminum-rich layer. The bond layer promotes adhesion between the coated substrate and a thermal barrier coating which is applied at a later stage. The bond layer also provides further protection to the substrate, especially in those instances in which the part may be exposed to damaging environments. Exemplary bond coat layers are known in the art and described, for example, in U.S. Pat. Nos. 5,419,971 and 5,043,138, both incorporated herein by reference. The bond coat usually has a thickness in the range of about 50 microns to about 500 microns, and preferably, in the range of about 50 microns to about 375 microns. Preferred bond coatings for this invention have the formula MCrAlY, where "M" can be various metals or combinations of metals, such as Fe, Ni, or Co. In many instances, "M" is preferably nickel.

The bond coat may be applied by a variety of conventional techniques, such as plasma spray or other thermal spray deposition methods, such as HVOF, detonation, or wire spray; CVD (chemical vapor deposition); or combinations of plasma spray and CVD techniques. Sometimes, it may be convenient to employ the same deposition technique used to apply the aluminum-rich layer.

In many instances, a plasma spray technique is the preferred method for depositing the bond layer. Specific, non-limiting examples are low pressure plasma spraying and air plasma spraying. Details regarding plasma spraying can also be found, for example, in Kirk-Othmer's *Encyclopedia of Chemical Technology*, 3rd Edition, Vol. 15, (1981) and Vol. 20 (1982); in *Ullmann's Encyclopedia of Industrial Chemistry,* Fifth Edition; Volume A6, VCH Publisher (1986); in *Scientific American,* H. Herman, September, 1988; and in U.S. Pat. 5,384,200, incorporated herein by reference. One of ordinary skill in the art can easily become familiar with various process details which may be relevant: spray distances; selection of the number of spray-passes, gas temperature; powder feed rate; powder particle size and size distribution; heat treatment after deposition; or any other type of treatment after deposition.

A heat treatment as described earlier may be carried out after deposition of the bond coat layer. This heat treatment could replace the earlier heat treatment, or it could be an additional treatment. The conditions for this heat treatment would be similar to those described earlier.

The thermal barrier coating is then applied over the bond coat, or over the aluminum-rich layer in those instances in which a bond coat is not employed. Usually, the TBC is zirconia-based, as mentioned previously. As used herein, "zirconia-based" embraces ceramic materials which contain at least about 50% zirconia. In preferred embodiments, the zirconia is chemically stabilized by being blended with a material such as yttrium oxide, calcium oxide, magnesium oxide, cerium oxide, scandium oxide, or mixtures of any of those materials. In one specific example, zirconia can be blended with about 1% by weight to about 20% by weight yttrium oxide (based on their combined weight), and preferably, from about 3%–10% yttrium oxide.

The thermal barrier coating can be applied by a variety of techniques, one being electron beam physical vapor deposition (EB-PVD). In some preferred embodiments, the thermal barrier coating is applied by plasma-spray techniques, which were described previously. Plasma spray systems are especially suited for coating large parts, with good control over the thickness and uniformity of the coatings. In general, the thickness of the thermal barrier coating is in the range of about 75 microns to about 2000 microns. The most appropriate thickness depends in large part on the end use of the component.

After the thermal barrier coating has been applied, a heat treatment may be carried out, in addition to or in lieu of either of the earlier heat treatments. The conditions for this heat treatment are usually similar to those described earlier, although additional factors are taken into consideration, such as the thickness and composition of the thermal barrier coating. In preferred embodiments, the heat treatment at this stage will be carried out at a temperature in the range of about 980° C. to about 1210° C., for a time period of about 15 minutes to about 16 hours.

As mentioned earlier, a specific heat treatment need not be carried out in some embodiments of this invention. For example, a component such as a turbine engine would eventually be exposed to elevated temperatures, such as about 750° C. to about 1150° C., during its service life. Such thermal exposure would sometimes be sufficient to promote the diffusion of aluminum from the aluminum-rich layer into the substrate and any adjacent bond coat. The in-service heat treatment can occur as a supplement to one or more heat treatments carried out earlier, as discussed above.

It should be apparent from the discussion set forth above that another aspect of this invention is directed to a metal article provided with a protective coating, comprising:

(i) a metal-based substrate; and (ii) an aluminum-containing layer over the substrate, comprising a discontinuous layer of aluminum-rich particles.

In many situations, a coating layer such as a bond coat or thermal barrier coating or both (component (iii)) is applied over the aluminum-containing layer, as described previously.

The amount of aluminum in layer (ii), as applied, is usually in the range of about 4% by weight to about 32% by weight. In preferred embodiments, the amount of aluminum is in the range of about 10% by weight to about 20% by weight. In some especially preferred embodiments, the amount of aluminum is in the range of about 12.5% by weight to about 19% by weight, as described previously. The thickness of layer (ii) is usually in the range of about 25 microns to about 400 microns.

In some embodiments, a metallic bond layer is disposed between layer (ii) and the thermal barrier coating layer (iii). The bond layer usually comprises an alloy of the formula MCrAlY, as described above.

Very often, the metal-based substrate is a superalloy, such as a nickel-based superalloy. In those instances, the thermal barrier coating is often zirconia-based. The superalloy may be a turbine engine component, for example. The presence of the aluminum-rich layer provides critical aluminum replenishment to both the substrate and any bond coat that has been applied before the deposition of the TBC. This replenishment in turn enhances the oxidation-resistance of the component.

EXAMPLES

The following examples are merely illustrative, and should not be construed to be any sort of limitation on the scope of the claimed invention.

In this example, an aluminum-rich layer was first applied to a series of superalloy substrates. Each substrate was a button made from a nickel-based alloy, Rene® N-5, having a diameter of about 1 inch (2.54 cm), and a thickness of about 0.125 inch (3.18 mm). Prior to deposition of the aluminum-rich layer, the coupons were cleaned with isopropyl alcohol and grit-blasted.

The aluminum-rich layer was formed from two components. Component (I) was NiAl, having a nominal composition of 68.5 wt. % Ni and 31.5 wt. % Al (i.e., 50 atomic % Ni, 50 atomic % aluminum). Component (II) was NiCrAlY, having a nominal composition as follows: 68 wt. % Ni, 22 wt. % Cr, 9 wt. % Al, and 1 wt. % Y. The particle size of components (I) and (II) was in the range of about 15 microns to about 44 microns.

For sample A (within the scope of this invention), the weight-ratio of component (I) to component (II) was 20:80. For sample B (within the scope of this invention), the weight-ratio of component (I) to component (II) was 40:60. For sample C, which was a control, the weight-ratio of component (I) to component (II) was 0:100. In other words, the control sample consisted of only NiCrAlY. The aluminum-rich mixture was mechanically pre-mixed and air plasma-sprayed onto the substrate, using a standard, 45 kw plasma spray gun under nitrogen/hydrogen conditions. The following conditions were employed:

Gun Power: Approximately 45 kw

Gun-to-Substrate Distance: 5 inches (12.7 cm)

Gun Speed 1185 mm/sec (2800 in/min)

Powder Feed Rate: 6 pounds/hour (2.72 kg/hour)

The average thickness of the aluminum-rich layer was about 75 microns to about 175 microns. For each sample, a bond coat was then deposited on top of the aluminum-rich layer, using the air plasma spray system. The composition of the bond coat was the same as component (II) above, i.e., it was made up entirely of the NiCrAlY material. The spray conditions were the same as those used to apply the aluminum-rich mixture.

Photomicrographs of Samples A and B were taken with a Zeiss Axiovert Metallograph optical microscope. For each of the two samples, the outermost coating layer corresponding to the bond coat had a thickness of about 125 microns (+ or − about 20 microns), and primarily comprised NiCrAlY and voids. The innermost coating layer corresponding to the aluminum-rich coating, measured for each sample, had a thickness of about 125 microns (+ or − about 20 microns), and primarily comprised a mixture of NiCrAlY and NiAl.

In each figure, the light gray areas depicted by the arrows represent particles of NiAl. It is clear that the majority of these particles are surrounded by the "whitish" sections which represent NiCrAlY. The black area represents voids or pores within the coating structure.

Contiguity was measured from four fields of view, using multiple test lines, and generally following the procedure outlined in the Quantitative Stereology text mentioned above. For sample A, the contiguity fraction was about 32% to about 42%. For sample B, the contiguity fraction was about 50% to about 56%. Thus, in each instance, a discontinuous layer of aluminum-rich particles was present.

Standard thermal barrier coatings could be applied over the discontinuous layer according to conventional procedures, as described previously.

Other coated samples, herein referred to as Samples D, E, and F, were tested to determine aluminum content as a function of substrate depth and bond coat depth for articles based on the present invention. Data was taken prior to any heat treatment of the coated samples, as well as after a vacuum heat treatment was performed on the coated samples, at a temperature of about 1080° C. for 4 hours.

Sample D was very similar to sample A, and was formed in the same manner, using the same plasma spray conditions, i.e., APS-deposition of the same aluminum-rich layer of NiAl and NiCrAlY in a 20:80 weight ratio, followed by the APS-deposition of the NiCrAlY bond coat. Sample E was very similar to sample B, and was formed in the same manner, using the same spray conditions, i.e., APS-deposition of the aluminum-rich layer of NiAl and NiCrAlY in a 40:60 weight ratio, followed by the APS-deposition of the NiCrAlY bond coat. Sample F was similar to sample C, i.e., a control which consisted of only NiCrAlY.

As for the previous samples, the substrate in each case was the nickel-based alloy, Rene® N-5. The nominal aluminum level in the substrate was 14 atomic %, while the nominal aluminum level in the NiCrAlY material was 19 atomic %. Composition profiles for each sample in both the as-sprayed and the heat-treated conditions were generated based on the average of ten spot-scan profiles taken from different regions of the same sample.

In the "as-sprayed" condition (i.e., prior to heat treatment), the aluminum content of the NiCrAlY bond layer was slightly higher than that of the substrate alloy, but lower than that expected from the nominal composition of the NiCrAlY material. The aluminum content was lower because of surface oxidation of the particles that occurred during APS. Further reduction in the aluminum content in the bond coat occurred during the heat treatment, possibly due to interdiffusion with the underlying substrate. The resulting aluminum-composition profile showed very little difference in aluminum content for the bond coat, as compared to the substrate alloy.

The addition of NiAl to NiCrAlY in a 20:80 weight ratio to the first 5 mil (about 125 microns) layer of the NiCrAlY bond coat (Sample D) raised the aluminum content of the bond coat slightly. Even after the heat treatment, this portion of the bond coat layer contained about 5 atomic % more aluminum than the substrate. The excess aluminum would be available for oxidation or for interdiffusion into the substrate.

In the case of sample E (NiAl and NiCrAlY in a 40:60 weight ratio), the aluminum-enrichment was more pronounced, with aluminum content rising as high as 30 atomic %. As in the case of sample D, the aluminum enrichment was still present after the heat treatment, and was concentrated in about the first 5 mil (about 125 microns) layer of the NiCrAlY bond coat.

Some of the preferred embodiments have been set forth in this disclosure for the purpose of illustration. However, the foregoing description should not be deemed to be a limitation on the scope of the invention. Accordingly, various modifications, adaptations, and alternatives may occur to one skilled in the art without departing from the spirit and scope of the claimed inventive concept.

What is claimed is:

1. A method for providing a protective coating on a metal-based substrate, comprising the following step:
   (a) applying an aluminum-rich mixture to the substrate to form a discontinuous layer of aluminum-rich particles in a matrix of metallic bond coat alloy, wherein the amount of aluminum in the particles exceeds the amount of aluminum in the metallic bond coat alloy by about 0.1 atomic % to about 40 atomic %, and wherein the total amount of aluminum in the aluminum-rich mixture is in the range of about 10 atomic % to about 50 atomic %.

2. The method of claim 1, wherein the aluminum-rich mixture comprises particles of a first component (component I) and particles of a second component (component II).

3. The method of claim 2, wherein component (I) comprises particles of aluminum and a second metal, and component (II) comprises particles of an alloy of the formula MCrAlY, where M is selected from the group consisting of Fe, Ni, Co, and mixtures thereof.

4. The method of claim 3, wherein the second metal for component (I) is nickel.

5. The method of claim 3, wherein the level of component (I) is at least about 1% by volume, based on the total volume of components (I) and (II).

6. The method of claim 5, wherein the level of component (I) is in the range of about 5% by volume to about 50% by volume, based on the total volume of components (I) and (II).

7. The method of claim 6, wherein the level of component (I) is in the range of about 15% by volume to about 50% by volume, based on the total volume of components (I) and (II).

8. The method of claim 1, wherein the discontinuous layer of aluminum-rich particles is characterized by a contiguity fraction, and the contiguity fraction is less than about 65%.

9. The method of claim 1, wherein the aluminum-rich layer has a thickness in the range of about 25 microns to about 400 microns.

10. The method of claim 1, wherein the aluminum-rich mixture is applied by a plasma spray technique.

11. The method of claim 10, wherein the discontinuous layer of aluminum-rich particles is heat-treated.

12. The method of claim 11, wherein the heat-treatment is carried out at a temperature in the range of about 925° C. to about 1260° C., for a time period between about 15 minutes and about 16 hours.

13. The method of claim 1, wherein a metallic bond layer is applied over the discontinuous layer of aluminum-rich particles.

14. The method of claim 13, wherein the metallic bond layer comprises an alloy of the formula MCrAlY, where M is selected from the group consisting of Fe, Ni, Co, and mixtures of any of the foregoing.

15. The method of claim 14, wherein the metallic bond layer has a thickness in the range of about 50 microns to about 500 microns.

16. The method of claim 15, wherein the metallic bond layer is applied by a plasma spray process.

17. The method of claim 1, wherein the metal-based substrate is a nickel-based superalloy.

18. The method of claim 1, wherein a thermal barrier coating is applied over the discontinuous layer of aluminum-rich particles.

19. The method of claim 1, wherein substantially all of the aluminum-rich mixture comprises non-oxide particles.

20. A method for providing a protective coating on a metal-based substrate, comprising the following steps:
   (a) applying an aluminum-rich mixture to the substrate to form a discontinuous layer of aluminum-rich particles in a matrix of metallic bond coat alloy, wherein the amount of aluminum in the particles exceeds the amount of aluminum in the metallic bond coat alloy by about 0.1 atomic % to about 40 atomic %, and wherein the total amount of aluminum in the aluminum-rich mixture is in the range of about 10 atomic % to about 50 atomic %, and then
   (b) applying at least one coating layer over the discontinuous layer of aluminum-rich particles.

21. The method of claim 20, wherein the aluminum-rich mixture comprises particles of a first component (component I) and particles of a second component (component II).

22. The method of claim 21, wherein component (I) comprises particles of aluminum and a second metal, and component (II) comprises particles of an alloy of the formula MCrAlY, where M is selected from the group consisting of Fe, Ni, Co, and mixtures thereof.

23. The method of claim 22, wherein the second metal for component (I) is nickel.

24. The method of claim 22, wherein the level of component (I) is at least about 1% by volume, based on the total volume of components (I) and (II).

25. The method of claim 24, wherein the level of component (I) is in the range of about 5% by volume to about 50% by volume, based on the total volume of components (I) and (II).

26. The method of claim 25, wherein the level of component (I) is in the range of about 15% by volume to about 50% by volume, based on the total volume of components (I) and (II).

27. The method of claim 20, wherein the discontinuous layer of aluminum-rich particles is characterized by a contiguity fraction, and the contiguity fraction is less than about 65%.

28. The method of claim 20, wherein the aluminum-rich layer has a thickness in the range of about 25 microns to about 400 microns.

29. The method of claim 20, wherein the aluminum-rich mixture is applied by a plasma spray technique.

30. The method of claim 29, wherein the discontinuous layer of aluminum-rich particles is heat-treated.

31. The method of claim 30, wherein the heat-treatment is carried out at a temperature in the range of about 925° C. to about 1260° C., for a time period between about 15 minutes and about 16 hours.

32. The method of claim 20, wherein a metallic bond layer is applied over the discontinuous layer of aluminum-rich particles.

33. The method of claim 32, wherein the metallic bond layer comprises an alloy of the formula MCrAlY, where M is selected from the group consisting of Fe, Ni, Co, and mixtures of any of the foregoing.

34. The method of claim 33, wherein the metallic bond layer has a thickness in the range of about 50 microns to about 500 microns.

35. The method of claim 34, wherein the metallic bond layer is applied by a plasma spray process.

36. The method of claim 20, wherein the metal-based substrate is a nickel-based superalloy.

37. The method of claim 20, wherein a thermal barrier coating is applied over the discontinuous layer of aluminum-rich particles.

* * * * *